(12) United States Patent
Maeda et al.

(10) Patent No.: US 7,862,084 B2
(45) Date of Patent: Jan. 4, 2011

(54) VEHICLE STEERING APPARATUS

(75) Inventors: Shingo Maeda, Kashiwara (JP);
Ryouhei Hayama, Nabari (JP);
Sadahiro Kawahara, Kashihara (JP);
Shiro Nakano, Minamikawachi-gun (JP); Kou Shiba, Hirakata (JP)

(73) Assignee: JTEKT Corporation, Osaka-shi (JP)

( * ) Notice: Subject to any disclaimer, the term of this patent is extended or adjusted under 35 U.S.C. 154(b) by 210 days.

(21) Appl. No.: 12/205,127

(22) Filed: Sep. 5, 2008

(65) Prior Publication Data
US 2009/0065285 A1    Mar. 12, 2009

(30) Foreign Application Priority Data
Sep. 10, 2007    (JP) ............................... 2007-233601

(51) Int. Cl.
*B62D 1/18* (2006.01)
(52) U.S. Cl. ........................ 280/775; 180/402; 74/493
(58) Field of Classification Search ................... 74/493, 74/495; 180/334, 402; 280/93.502, 93.51, 280/775, 779
See application file for complete search history.

(56) References Cited

U.S. PATENT DOCUMENTS

| | | | | |
|---|---|---|---|---|
| 2,988,931 | A * | 6/1961 | Markley, Jr. et al. | 74/556 |
| 3,429,196 | A * | 2/1969 | White | 74/493 |
| 3,556,550 | A * | 1/1971 | Franchini | 280/777 |
| 4,291,896 | A * | 9/1981 | Koch | 280/775 |
| RE31,646 | E * | 8/1984 | Beals et al. | 180/78 |
| 4,537,089 | A * | 8/1985 | Moneta | 74/493 |
| 4,580,647 | A * | 4/1986 | Peifer et al. | 180/78 |
| 4,706,776 | A * | 11/1987 | Hyoki et al. | 180/334 |
| 6,070,686 | A * | 6/2000 | Pollmann | 180/287 |
| 6,227,327 | B1 * | 5/2001 | Nigrin et al. | 180/402 |
| 6,491,128 | B1 * | 12/2002 | Lehmann et al. | 180/315 |
| 6,857,498 | B2 * | 2/2005 | Vitale et al. | 180/326 |
| 6,938,720 | B2 * | 9/2005 | Menjak et al. | 180/402 |
| 6,997,281 | B2 * | 2/2006 | Chernoff et al. | 180/333 |
| 7,017,704 | B2 * | 3/2006 | Kapaan et al. | 180/315 |
| 7,147,080 | B2 * | 12/2006 | Higashi et al. | 180/315 |

(Continued)

FOREIGN PATENT DOCUMENTS

DE    3725908 A1 *    2/1989

(Continued)

OTHER PUBLICATIONS

U.S. Appl. No. 12/205,238, filed Sep. 5, 2008, Maeda et al.

*Primary Examiner*—Faye M. Fleming
*Assistant Examiner*—Laura Freedman
(74) *Attorney, Agent, or Firm*—Oblon, Spivak, McClelland, Maier & Neustadt, L.L.P.

(57) ABSTRACT

A vehicle steering apparatus, includes a steering member for rotational operation, a support mechanism that supports the steering member so as to be movable between a housing position where the steering member is housed in a fixed frame of an instrument panel and a projection position where the steering member projects to an outside of the fixed frame, and that regulates an attitude of the steering member located between the housing position and the projection position, and a movable frame that moves together with the steering member, and that constitutes a part of the instrument panel by covering an opening formed in the fixed frame of the instrument panel when the steering member is housed at the housing position.

10 Claims, 7 Drawing Sheets

U.S. PATENT DOCUMENTS

| | | | |
|---|---|---|---|
| 7,418,326 B2 * | 8/2008 | Ogawa et al. | 701/41 |
| 7,441,799 B2 * | 10/2008 | Enders et al. | 280/731 |
| 7,455,319 B2 * | 11/2008 | Haglund et al. | 280/775 |
| 2009/0050397 A1 * | 2/2009 | Onuma | 180/402 |
| 2009/0064815 A1 * | 3/2009 | Maeda et al. | 74/493 |

FOREIGN PATENT DOCUMENTS

| | | | |
|---|---|---|---|
| DE | 102006006995 A1 * | 8/2007 | |
| EP | 1283146 A2 * | 2/2003 | |
| FR | 2861657 A1 * | 5/2005 | |
| JP | 2004-182141 | 7/2004 | |
| JP | 2007145146 A * | 6/2007 | |
| WO | WO 03020571 A1 * | 3/2003 | |

* cited by examiner

VEHICLE STEERING APPARATUS

BACKGROUND

The present invention relates to a vehicle steering apparatus for use in a vehicle, such as an automobile.

A vehicle steering apparatus that enables housing of a steering member in an instrument panel has hitherto been proposed (see; for instance, Patent Document 1).

[Patent Document 1] JP-A-2004-182141

However, in the vehicle steering apparatus described in Patent Document 1, a steering member is supported by only two serially-joined arms. Hence, when the steering member is housed in an instrument panel or caused to protrude from the instrument panel, the attitude of the steering member is freely changed, as a consequence of which a space required for movement of the steering member becomes larger.

SUMMARY

The present invention has been conceived against the background and aims at providing a vehicle steering apparatus that enables smooth displacement of the steering member at a desired attitude.

The present invention for achieving the object provides a vehicle steering apparatus, comprising:

a steering member for rotational operation;

a support mechanism that supports the steering member so as to be movable between a housing position where the steering member is housed in a fixed frame of an instrument panel and a projection position where the steering member projects to an outside of the fixed frame and that regulates an attitude of the steering member between the housing position and the projection position; and a movable frame that moves together with the steering member, and that constitutes a part of the instrument panel by covering an opening formed in the fixed frame of the instrument panel when the steering member is housed at the housing position.

According to the present invention, the attitude of the steering member located between the housing position and the projection position can be regulated by the support mechanism. Consequently, the space required for movement of the steering member can be reduced. Further, according to the present invention, when the steering member is situated at the housing position, the movable frame constitutes a part of the instrument panel, and hence the instrument panel having an external sense of oneness is constituted.

Preferably, the support mechanism includes a link mechanism having first and second link arms whose first ends are rotatably supported by a base respectively and a third link arm which has first and second ends rotatably linked to second ends of the first and second link arms respectively, and a support frame which is fixed to the third link arm through a bracket and which rotatably supports the steering member.

In this case, a change in the attitude of the third link arm can be desirably adjusted by adjusting positions of fulcrums for rotation of the first and second link arms and lengths of the respective link arms, whereby the space required for movement of the steering member can be reduced.

Preferably, the vehicle steering apparatus comprises a cover that covers at least a portion of the opening of the fixed frame when the steering member is located at the projection position. In this case, at least a part of the opening of the fixed frame is covered with the cover, and hence an instrument panel whose appearance has a sense of oneness is configured even when the steering member is situated at the projection position.

Preferably, the vehicle steering apparatus comprises a steering member forward/rearward movement actuator that drives the steering member between the housing position and the projection position through the support mechanism. In this case, the steering member can be automatically moved to the housing position or the projection position. As a result, the convenience of the vehicle steering apparatus is enhanced.

Preferably, a direct drive actuator that rotates any one of the first link arm and the second link arm is used as the steering member forward/rearward movement actuator. In this case, either the first or second link arm is rotated, whereby the third link arm is displaced, and the steering member is displayed along with displacement of the third link arm.

Preferably, the vehicle steering apparatus comprises a turning mechanism that turns driving wheels. The steering member is not mechanically linked to the turning mechanism. In this case, the arrangement of the steering member is not limited by the turning mechanism, and hence the foregoing configuration is utilized in a particularly effective manner, so that the foregoing advantage can be sufficiently yielded.

BRIEF DESCRIPTION OF THE DRAWINGS

The above objects and advantages of the present invention will become more apparent by describing in detail preferred exemplary embodiments thereof with reference to the accompanying drawings, wherein:

FIG. 7 is an illustrative side view of the steering member including the movable frame, and the like;

FIG. 8 is an illustrative plan view of the steering member including the movable frame, and the like;

DETAILED DESCRIPTION OF EXEMPLARY EMBODIMENTS

An embodiment of the present invention will be specifically described hereunder by reference to the drawings.

Figure 1:
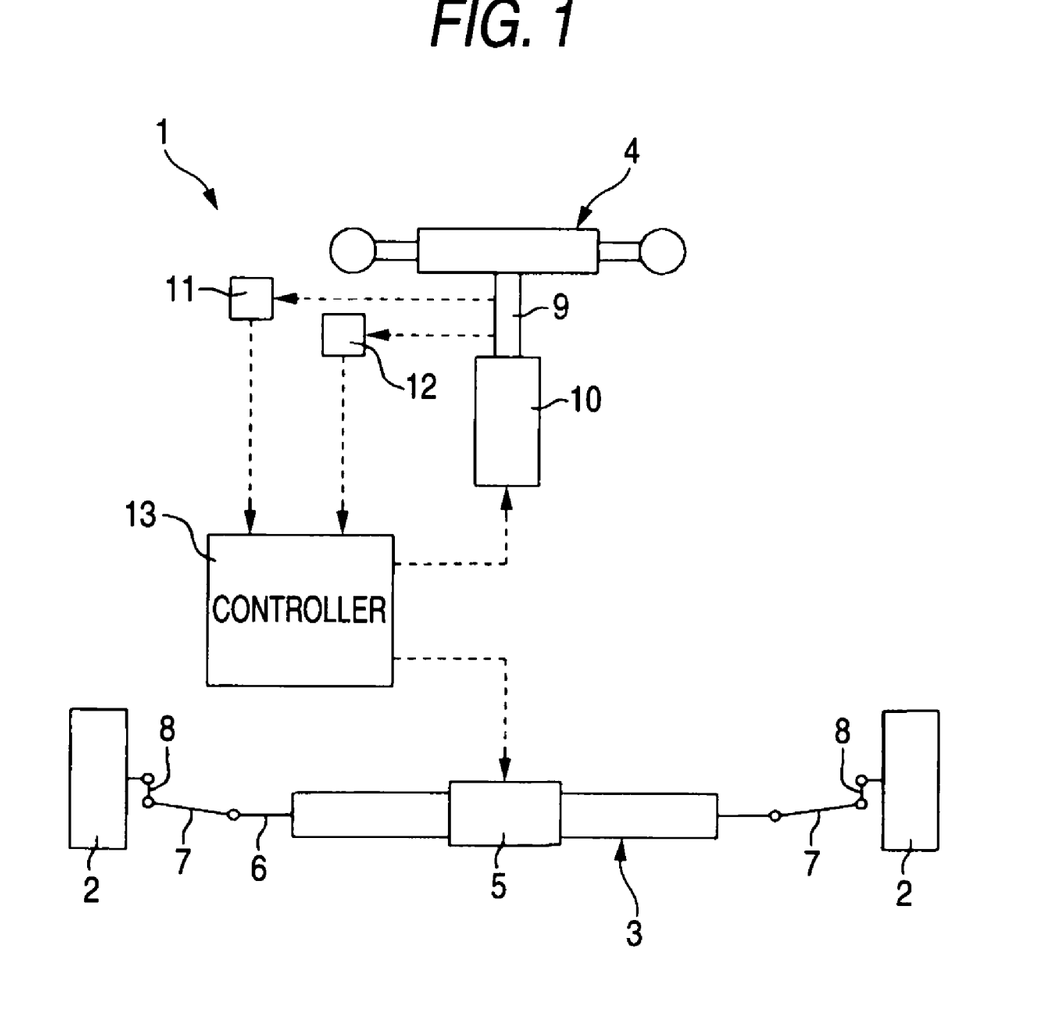
FIG. 1 is a schematic view showing the general configuration of a vehicle steering apparatus of an embodiment of the present invention.

FIG. 1 is a schematic diagram showing the general configuration of a vehicle steering apparatus 1 of an embodiment of the present invention. By reference to FIG. 1, the vehicle steering apparatus 1 is of so-called steer-by-wire type in which a turning mechanism 3 for turning driving wheels 2 is not mechanically linked to a steering member 4.

Operation of a steering actuator 5 to be driven in response to rotation of the steering member 4 is converted into linear movement of a steering shaft 6 in a widthwise direction of the vehicle. The linear movement of the steering shaft 6 is converted into steering movement of the right and left driving wheels 2, 2 for steering purpose, whereby steering is accomplished.

The steering actuator 5 is configured so as to include an electric motor; for instance, a brushless motor. Driving force (rotational force appearing on an output shaft) of the steering actuator 5 is converted into linear movement of the steering shaft 6 in its axial direction (the widthwise direction of the vehicle) by an unillustrated movement conversion mechanism (e.g., a ball screw mechanism) provided in association with the steering shaft 6. The linear movement of the steering shaft 6 is transmitted to tie rods 7 joined to respective axial ends of the steering shaft 6, thereby inducing rotation of steering knuckle arms 8. Thus, steering of the driving wheels 2 supported by the steering knuckle arms 8 is attained. The turning mechanism 3 for turning the driving wheels 2 is built up of the steering shaft 6, the tie rods 7, and the steering knuckle arms 8.

The steering member 4 is joined to a rotary shaft 9 rotatably supported by an unillustrated car body. The rotary shaft 9 is joined to a counterforce actuator 10 for imparting steering counterforce to the steering member 4. The counterforce actuator 10 includes an electric motor, such as a brushless motor.

In association with the rotary shaft 9, a steering angle sensor 11 for detecting a steering angle of the steering member 4 is provided. Further, the rotary shaft 9 is provided with a torque sensor 12 for detecting steering torque imparted to the steering member 4. Although unillustrated, a steering angle sensor for detecting a steering angle of the driving wheels 2, a vehicle velocity sensor for detecting vehicle velocity, and the like, are provided in addition to the sensors 11 and 12.

Respective detection signals from the sensors are input to a controller 13 made up of an electronic control unit (ECU) including a microcomputer. The controller 13 drives and controls a steering actuator 5 in accordance with an input detection signal. In accordance with the input detection signal, the controller 13 controls the counterforce actuator 10 in such a way that appropriate counterforce arises in a direction opposite to the steering direction of the steering member 4.

Figure 2:
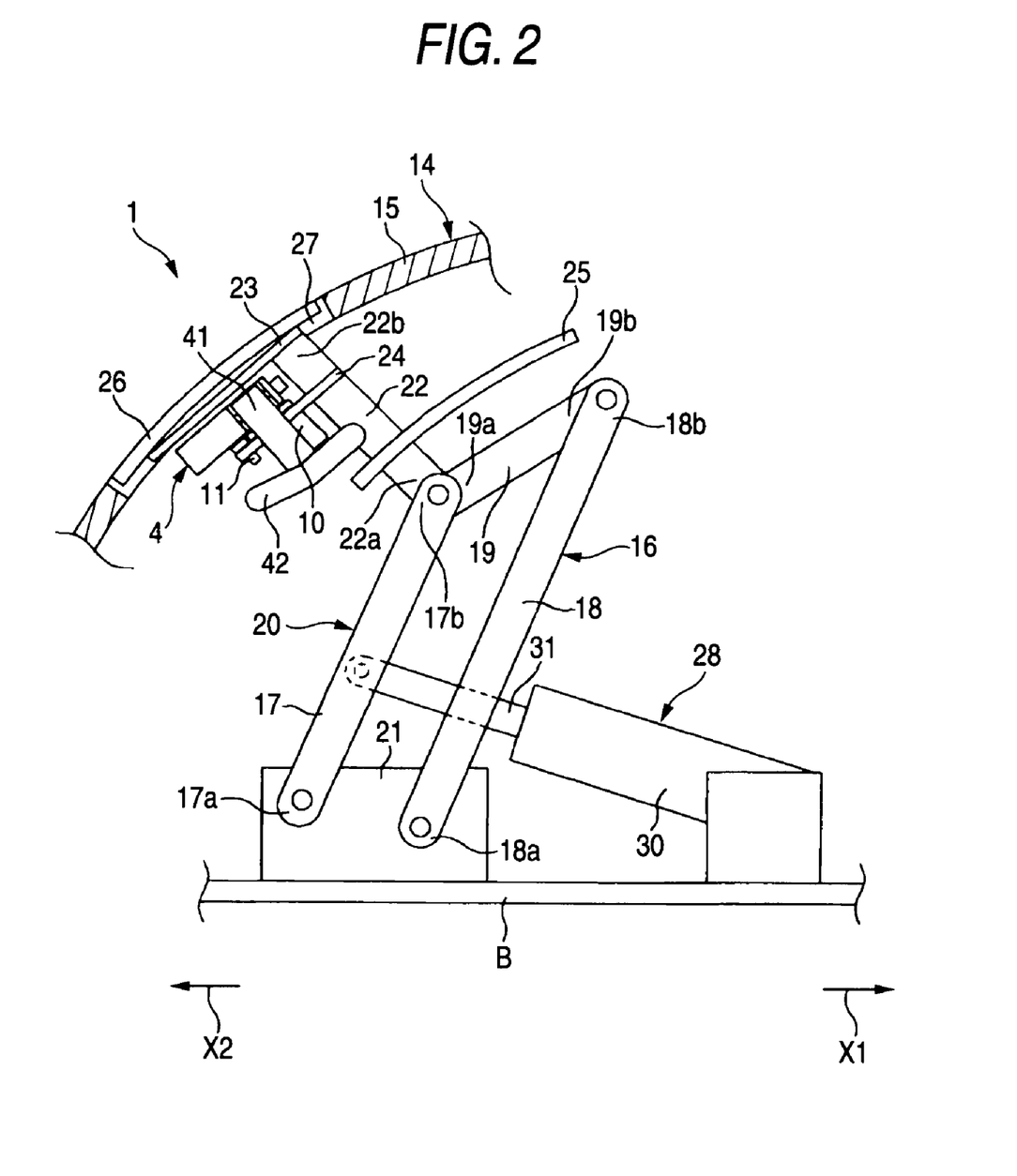
FIG. 2 is an illustrative side view of the principal section of the vehicle steering apparatus.
Figure 3:
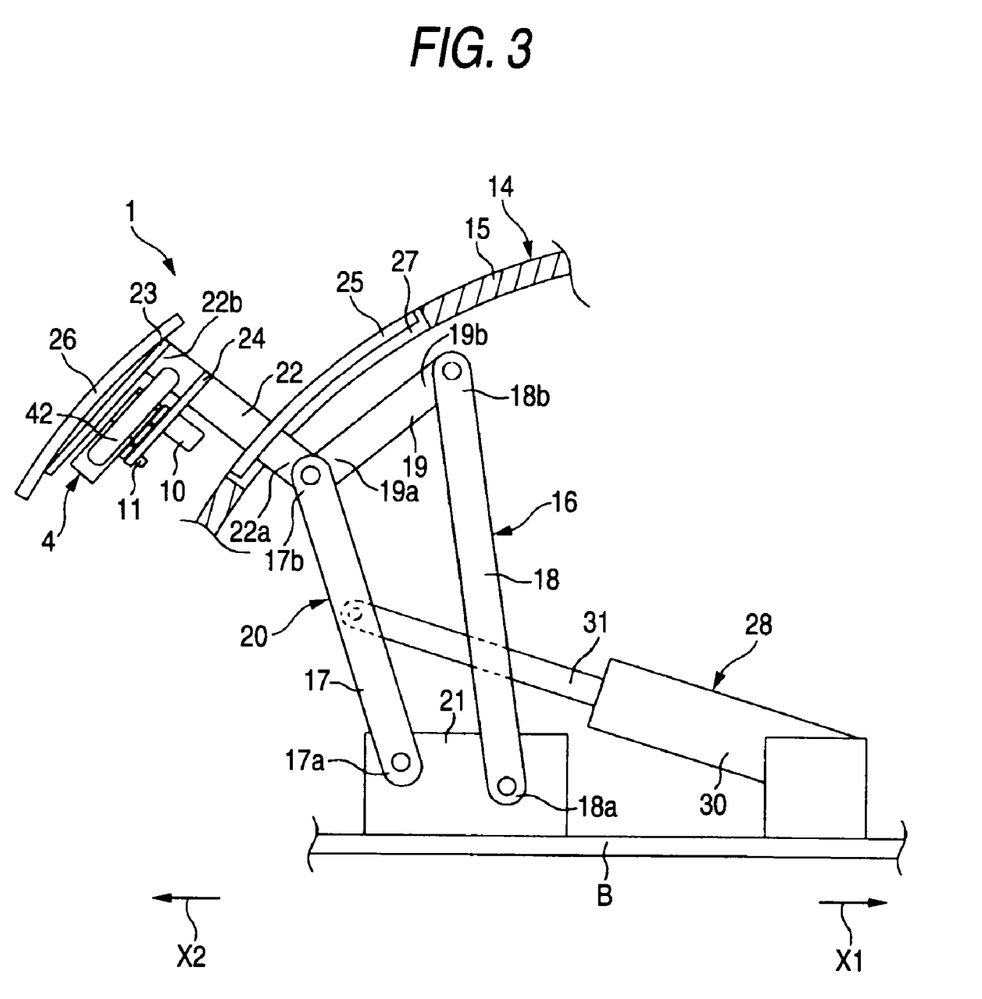
FIG. 3 is an illustrative side view of the principal section of the vehicle steering apparatus.
Figure 4:
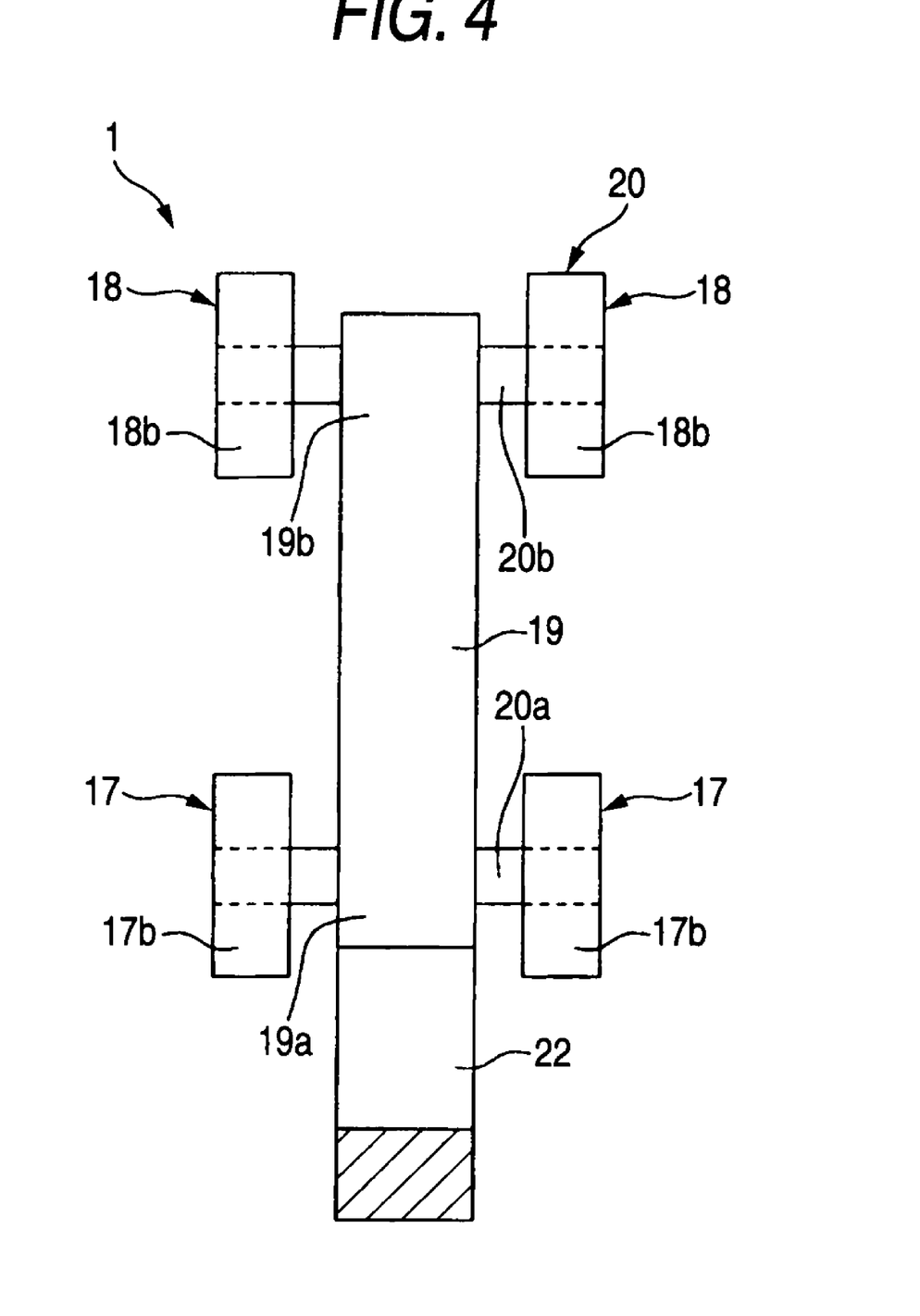
FIG. 4 is an illustrative plan view of the principal section of the vehicle steering apparatus.

FIGS. 2 and 3 are illustrative side views of the principal section of the vehicle steering apparatus 1. FIG. 4 is an illustrative plan view of the principal section of the vehicle steering apparatus 1. FIGS. 2 and 3 show a state where the vehicle steering apparatus 1 is attached to a vehicle. Right and left directions in FIGS. 2 and 3 correspond to the front and back directions of the vehicle. The right direction in FIGS. 2 and 3 corresponds to the front X1 of the vehicle, and the left direction in FIGS. 2 and 3 corresponds to the rear X2 of the vehicle.

In FIGS. 2 and 3, the driver's seat is disposed on the left side of the steering member 4. The steering member 4 can be moved between a housed position (see FIG. 2) where the steering member is housed in a fixed frame 15 of the instrument panel 14 and a projection position (see FIG. 3) where the steering member protrudes to the outside of the fixed frame 15 of the instrument panel 14.

By reference to FIGS. 2 and 3, the vehicle steering apparatus 1 is a vehicle steering apparatus capable of retraction of the steering member 4 within the fixed frame 15 of the instrument panel 14. The vehicle steering apparatus has a support mechanism 16 that supports the steering member 4, in a displaceable manner, at the housing position shown in FIG. 2 and the projection position shown in FIG. 3.

The support mechanism 16 has a link mechanism 20 made up of a first link arm 17 having a first end 17a and a second end 17b, a second link arm 18 having a first end 18a and a second end 18b, and a third link arm 19 having a first end 19a and a second end 19b. The steering member 4 is displaced as a result of rotation of the link arms 17, 18, and 19.

The first link arm 17 and the second link arm 18 are arranged in the longitudinal direction of the vehicle. The first end 17a of the first link arm 17 and the first end 18a of the second link arm 18 are respectively, rotatably supported by a base 21 fixed to a car body B.

By reference to FIG. 4, the first link arm 17 and the second link arm 18 are disposed side by side in a paired manner in a widthwise direction (the right and left directions in FIG. 4) of the link mechanism 20. The second ends 17b, 17b of the pair of first link arms 17, 17 are linked together by means of a connecting shaft 20a, and the second ends 18b, 18b of the pair of second link arms 18, 18 are linked together by means of a connecting shaft 20b.

The third link arm 19 links the second end 17b of the first link arm 17 to the second end 18b of the second link arm 18. Specifically, the second ends 17b, 17b of the pair of first link arms 17, 17 are linked to the second ends 18b, 18b of the pair of second link arms 18, 18 by means of the third link arm 19 by way of the pair of connecting shafts 20a, 20b.

The first end 19a of the third link arm 19 is rotatably linked to the second ends 17b, 17b of the pair of first link arms 17, 17 by way of the link shaft 20a, and the second end 19b of the third link arm 19 is rotatably linked to the second ends 18b, 18b of the pair of second link arms 18, 18 by way of the link shaft 20b.

Turning again to FIGS. 2 and 3, a first end 22a of a bracket 22 is fixed to the first end 19a of the third link arm 19. The bracket 22 makes a predetermined angle with respect to the third link arm 19. A first support frame 23, a second support frame 24, and a cover 25 are fixed to the bracket 22.

Specifically, the first support frame 23 and the second support frame 24 are fixed to the bracket 22 while spaced apart from each other. The second end 22b of the bracket 22 is fixed to the first support frame 23, and the second support frame 24 is fixed to a position proximate to the second end 22b.

A portion of the steering member 4 is interposed between the first support frame 23 and the second support frame 24. The steering member 4 is rotatably supported by the second support frame 24. A movable frame 26 for constituting a portion of the instrument panel 14 is fixed to a driver's seat side of the first support frame 23. The movable frame 26 is provided with an operation section 32 to be described later, and the like. The movable frame 26 is formed into a shape that enables covering an opening 27 formed in the fixed frame 15.

As shown in FIG. 2, when the steering member 4 is situated at the housing position, the movable frame 26 essentially covers the entire opening 27. Specifically, when the steering member 4 is situated at the housing position shown in FIG. 2, the instrument panel 14 is made up of the fixed frame 15 and the movable frame 26.

The fixed frame 15 assumes; for instance, a curved shape when viewed sideways. Further, the movable frame 26 assumes a curved shape smoothly connected to; for instance, the fixed frame 15, when viewed sideways. Therefore, when the steering member 4 is situated at the housing position shown in FIG. 2, the fixed frame 15 and the movable frame 26 constitute the instrument panel 14 that externally produces an illusion of integrity. A compartment space can be effectively utilized by housing the steering member 4 in the fixed frame 15.

In the meantime, the cover 25 is fixed to an intermediate position on the bracket 22. The cover 25 is formed into a shape that enables covering of the majority of the opening 27.

Although unillustrated, an insertion aperture through which the bracket 22 is inserted is formed in the cover 25. The cover 25 is fixed to the bracket 22 while the bracket 22 remains inserted into the insertion aperture.

As shown in FIG. 3, when the steering member 4 is located at the projection position, the cover 25 is situated in the opening 27, thereby covering at least a portion of the opening 27. Specifically, the cover 25 covers the entire or portion of a remaining area of the opening 27 except the location where the bracket 22, or the like, is disposed.

When the steering member 4 is situated at the projection position shown in FIG. 3, the instrument panel 14 is built up of the fixed frame 15 and the cover 25. The cover 25 assumes a curved shape smoothly connected to; for instance, the fixed frame 15, when viewed sideways. Therefore, when the steering member 4 is situated at the projection position shown in FIG. 3, the fixed frame 15 and the cover 25 constitute the instrument panel 14 that externally produces an illusion of integrity.

When the steering member 4 is situated at the projection position shown in FIG. 3, the cover 25 covers at least a portion of the opening 27, thereby preventing a substance from entering the fixed frame 15 from the opening 27 or an extraneous matter that is present in the fixed frame 15 from entering the space of the compartment from the opening 27. Displacement of the steering member 4 between the housing position and the projection position is realized by means of the controller 13 driving and controlling an actuator 28 that is for the purpose of moving a steering member forwardly or rearwardly.

The steering member 4 is linked to the actuator 28 by way of the second support frame 24, the bracket 22, the link mechanism 20, and the like, and driven by the actuator 28. The actuator 28 is linked to the link mechanism 20 and drives the link mechanism 20, whereby the steering member 4 is moved forwardly or rearwardly. For instance, a direct-drive motor or another direct-drive actuator is used as the actuator 28.

The direct-drive actuator serving as the actuator 28 includes a main body 30 secured to a car body B and a rod 31 held by the main body 30. The main body 30 can linearly move the rod 31 along the axial direction of the rod 31. The leading end of the rod 31 is rotatably linked to an intermediate position on the first link arm 17.

As a result of the rod 31 being linearly moved, the first link arm 17 receives drive force from the direct-drive actuator, to thus rotate while taking the first end 17a as a fulcrum. The first end 19a of the third link arm 19 linked to the first link arm 17 rotates along with the first link arm 17 while taking the first end 17a as a fulcrum. When the first end 19a of the third link arm 19 rotates along with the first link arm 17, the second link arm 18 rotates while taking the first end 18a as a fulcrum, thereby maintaining the attitude of the third link arm 19 in a desired state.

Specifically, the first end 19a of the third link arm 19 is rotatably linked to the second end 17b of the first link arm 17, and hence the first end 19a of the third link arm 19 rotates while taking the second end 17b of the first link arm 17 as a fulcrum. Further, the second end 19b of the third link arm 19 is rotatably linked to the second end 18b of the second link arm 18. Hence, the second end 19b of the third link arm 19 rotates while taking the second end 18b of the second link arm 18 as a fulcrum.

Meanwhile, a distance between the first end 19a and the second end 19b (corresponding to a distance between the second end 17b and the second end 18b) is constant. Further, the position of the first end 17a serving as a fulcrum for rotation of the first link arm 17 and the position of the first end 18a serving as a fulcrum for rotation of the second link arm 18 and lengths of the first, second, and third link arms 17, 18, and 19 are appropriately set. Thereby, the attitude of the third link arm 19 is maintained in a desired state.

In the present embodiment, a change in the attitude of the third link arm 19 can be desirably adjusted by means of setting positions of the fulcrums (the first end 17a and the second end 18a) for rotation of the first and second link arms 17 and 18 and lengths of the first, second, and third link arms 17, 18, and 19. Thereby, the attitude of the steering member 4 can be desirably changed between the housing position (see FIG. 2) and the projection position (see FIG. 3).

Along with rotation of the third link arm 19 performed while the first end 17a of the first link arm 17 is taken as a fulcrum, the steering member 4 is smoothly displaced, while being maintained in a desired attitude, between the housing position and the projection position along a predetermined curve.

Hereby, the vehicle steering apparatus 1 is embodied as a steering system for an automobile having a high quality appearance.

In the present embodiment, the attitude of the steering member 4 can be displaced while being maintained in a desired state. Hence, a space required for movement of the steering member 4 is reduced, whereby an attempt is made to miniaturize the vehicle steering apparatus 1. Moreover, since the structure of the link mechanism 20 is simple in the present embodiment, adjustment of movement of the link mechanism 20 and assembly of the vehicle steering apparatus 1 are simple.

Further, the link arms 17, 18, and 19 can rotate around their respective fulcrums in the present embodiment. Hence, the driver collides with the steering member 4 (undergoes so-called double collision) at the time of; for instance, crash of a vehicle, thereby making it easy for the vehicle steering apparatus 1 to absorb the load imposed on the support mechanism 16. Therefore, the steering system is superior, in terms of a safety level, to a vehicle steering apparatus having a support mechanism for linearly displacing the steering member 4.

Figure 5:
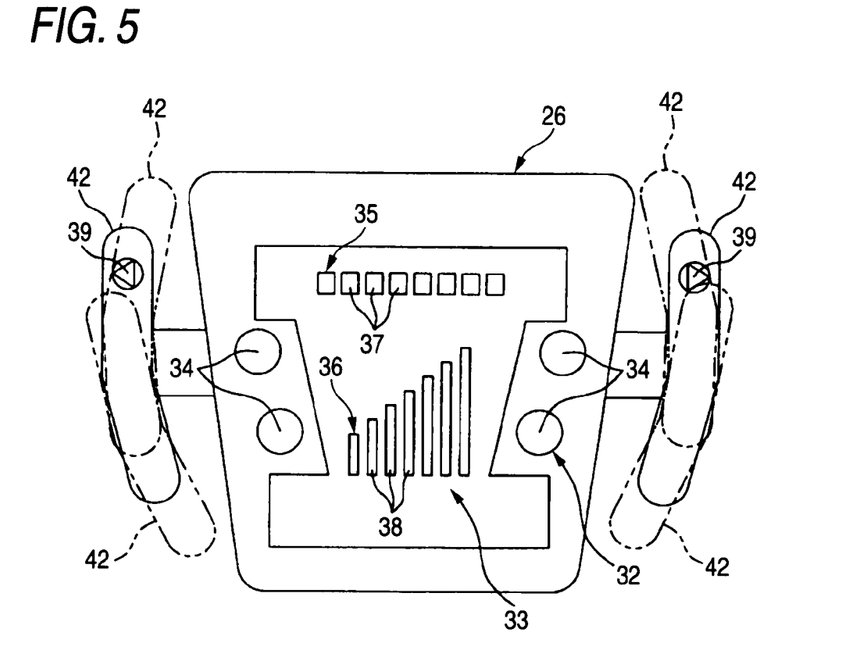
FIG. 5 is an illustrative front view of a movable frame.

FIG. 5 is an illustrative front view of the movable frame 26. By reference to FIG. 5, an operation section 32 and a display 33 are provided on the front of the movable frame 26 (a driver-seat-side of the movable frame 26). The operation section 32 is made up of a plurality of buttons 34 including; for instance, a button for use as an emergency blink indicator (a so-called hazard lamp), a button for a parking brake, and the like. The display 33 includes; for instance, an engine speed display 35 and a vehicle speed display 36.

The engine speed display 35 is built of a plurality of rectangular lighting sections 37 arranged in a widthwise direction (the right-and-left direction in FIG. 5) of the movable frame 26. With an increase in engine speed, only the lighting sections 37 corresponding in number to engine speed are illuminated in order from the left of FIG. 5.

The vehicle velocity display section 36 is made up of; for instance, a plurality of rod-shaped illumination sections 38 arranged in a widthwise direction of the movable frame 26. The illumination sections 38 differ in length from each other and extend in a heightwise direction (the vertical direction of FIG. 5) of the movable frame 26. The respective illumination sections 38 become longer with increasing distance in the rightward direction of FIG. 5. Lower ends of the respective illumination sections 38 are aligned to each other, and the upper ends of the respective illumination sections 38 become higher with an increasing distance in the rightward direction of FIG. 5. When the vehicle speed increases, the respective illumination sections 38 are arranged so as to become illuminated in number corresponding to vehicle speed and in order from the left end in FIG. 5.

A pair of grip sections 42, 42 of the steering member 4 to be described later are respectively equipped with buttons 39 for illuminating direction indicators.

Figure 6:
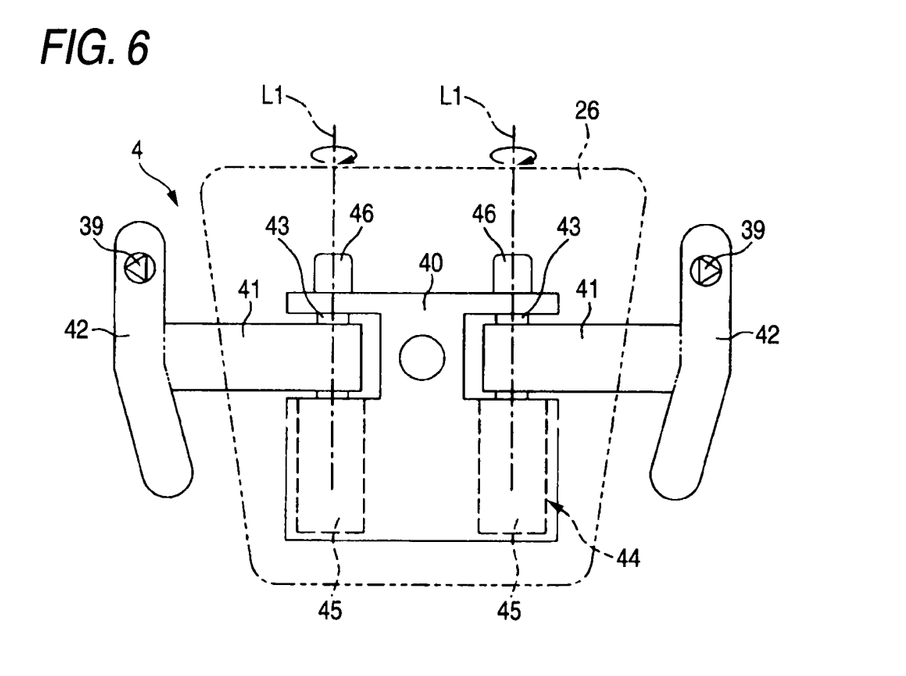
FIG. 6 is an illustrative front view of a steering member.
Figure 7:
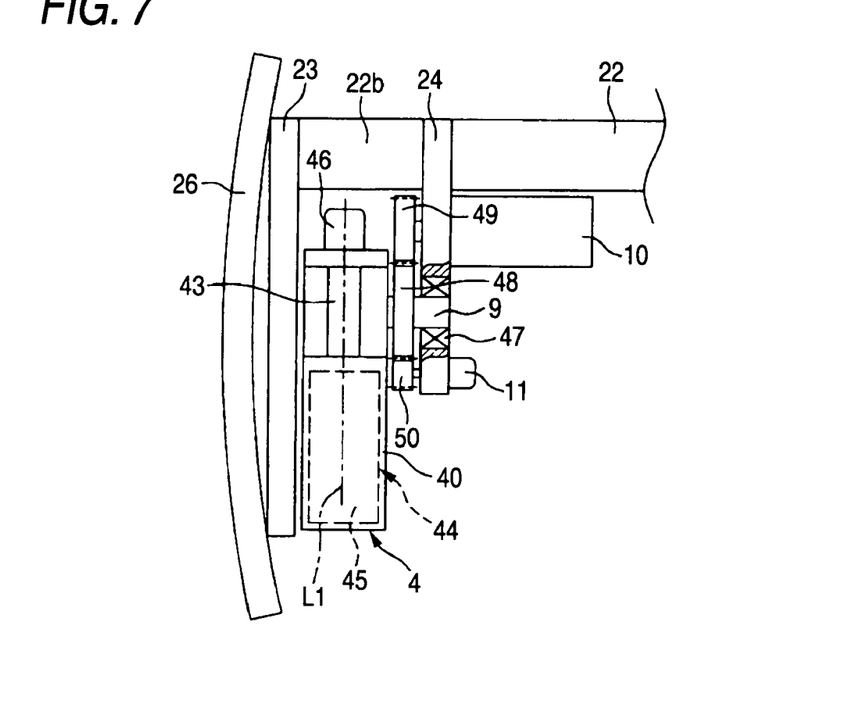
Figure 8:
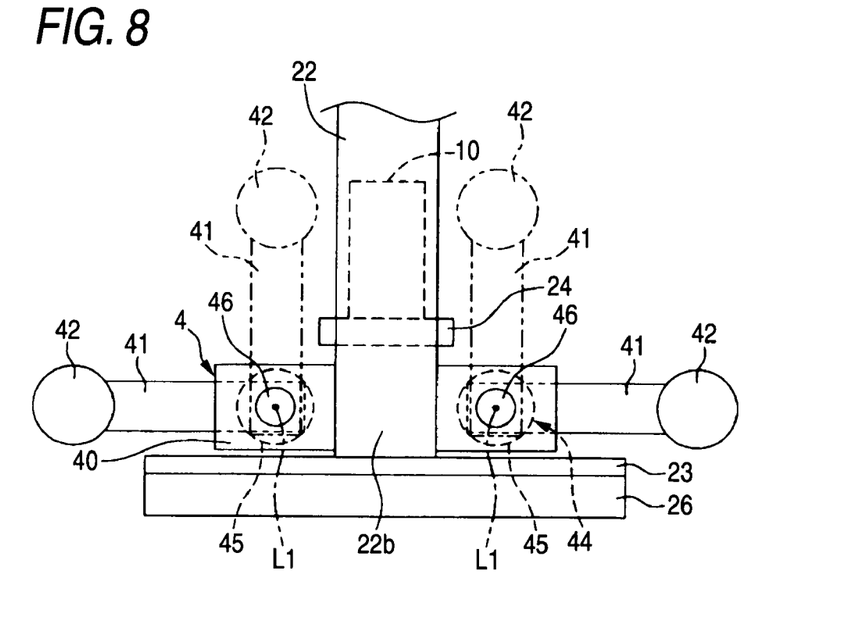

FIG. 6 is an illustrative front view of the steering member 4. FIG. 7 is an illustrative side view of the steering member 4 including the movable frame 26 and the like, and FIG. 8 is an illustrative plan view of the steering member 4 including the movable frame 26 and the like. Illustrations of the pair of rotary arms 41, 41 and the pair of grip sections 42, 42 are omitted from FIG. 7.

By reference to FIGS. 6, 7, and 8, the steering member 4 has a steering member main body 40; a pair of rotary arms 41, 41 rotatably supported by the steering member main body 40; and a pair of grip sections 42, 42 for use as driver's grips that are respectively secured to the pair of rotary arms 41, 41.

The steering member main body 40 is linked to the support mechanism 16 by way of the second support frame 24, the bracket 22, and the like, and are arranged so as to be displaced between the housing position (see FIG. 2) and the projection position (see FIG. 3). The pair of rotary arms 41, 41 and the pair of grip sections 42, 42 are arranged so as to move to the housing position and the projection position in synchronism with the steering member main body 40.

As shown in FIG. 6, the steering member main body 40 respectively holds a pair of rotary shafts 43, 43 in a rotatable manner. Each of the rotary shafts 43, 43 is rotatably held by the steering member main body 40 while the center line of the shaft is taken as an axis of rotation L1. The respective rotary shafts 43 extend in a heightwise direction of the steering member main body 40(the vertical direction of FIG. 6).

One end of each rotary arm 41 is fastened to an intermediate position on the corresponding rotary shaft 43. Further, the grip section 42 is fastened to the other end of each rotary arm 41. When the rotary shaft 43 rotates around the axis of rotation L1, the rotary arm 41 and the grip section 42 corresponding to the rotary shaft 43 rotate around the axis of rotation L1 of that rotary shaft 43.

Each of the rotary shafts 43 is linked to a grip section drive actuator 44 for driving the pair of grip sections 42, 42 between a nonoperating position (a position indicated by a two-dot chain line in FIG. 8) and the operating position (a position indicated by a solid line in FIG. 8). The grip section drive actuator 44 includes; for instance, a pair of rotary actuators 45, 45 coaxially aligned to the centers of rotation of the respective rotary arms 41 (the axis of rotations L1 of the corresponding rotary shafts 43). The pair of rotary actuators 45, 45 are fastened to the steering member main body 40.

For instance, an electric motor is mentioned as each of the rotary actuators 45. In the present embodiment, for instance, a geared motor incorporating a deceleration mechanism is used as each of the rotary actuators 45. Using a geared motor as each of the rotary actuators 45, the vehicle steering apparatus 1 is miniaturized further when compared with a configuration separately provided with a deceleration mechanism and an electric motor.

As a result of a pair of rotary actuators 45 being provided, a space is ensured between the rotary actuators 45, 45, so that another member can be positioned in the space. Hereby, an attempt is made to miniaturize the vehicle steering apparatus 1. Providing the pair of rotary actuators 45 enables miniaturization of the respective rotary actuators 45, and a wider space is consequently ensured between the pair of rotary actuators 45, 45.

Although unillustrated, output shafts of the respective rotary actuators 45 are coaxially fixed to corresponding rotary shafts 43. Therefore, when the output shaft of each of the rotary actuators 45 is rotated, the rotary shaft 43, the rotary arm 41, and the grip section 42, which rotate along with rotation of the output shaft, are rotated. Rotational positions of the respective rotary shafts 43 are detected by a position sensor 46; for instance, an optical rotary encoder, linked to a leading edge of the rotary shaft 43.

Detection signals from the respective position sensors 46 are arranged so as to be input to the controller 13, and the controller 13 drives and controls the respective rotary actuators 45 in accordance with the input detection signals. For instance, the controller 13 controls the pair of rotary actuators 45, 45 in such a way that rotational operations of the pair of rotary arms 41, 41 are synchronized.

In the present embodiment, the grip section drive actuator 44 is provided, so that the pair of grip sections 42, 42 can be automatically displaced between the nonoperating position (see the double-dot chain line in FIG. 8) and the operating position (see the solid line in FIG. 8). Consequently, the driver does not need to manually pull up the pair of grip sections 42, 42 before commencing steering operation, thus obviating consumption of efforts. Hereby, the convenience of the vehicle steering apparatus 1 is enhanced.

By reference to FIG. 7, the foregoing rotary shaft 9 is secured to the steering member main body 40. The leading end of the rotary shaft 9 is rotatably supported by the second support frame 24 by way of a bearing 47. The steering member main body 40 is rotatably supported by the second support frame 24 by way of the rotary shaft 9 and the bearing 47.

A gear 48 is linked to the rotary shaft 9. The gear 48 can rotate in synchronism with the rotary shaft 9. The gear 48 meshes with a gear 49 linked to an output shaft of an electric motor serving as the counterforce actuator 10 and a gear 50 linked to the foregoing steering angle sensor 11. In the present embodiment, for instance, an optical rotary encoder is used as the steering angle sensor 11.

Driving force of the counterforce actuator 10 is transmitted to the steering member 4 by way of the pair of gears 48, 49 and the rotary shaft 9. The electric motor serving as the counterforce actuator 10 is secured to the second support frame 24. The steering angle of the steering member 4 is detected from a change in the rotational position of the rotary shaft 9 transmitted to the steering angle sensor 11 by way of the pair of gears 48, 50. The steering angle sensor 11 is fixed to the second support frame 24.

Figure 9:
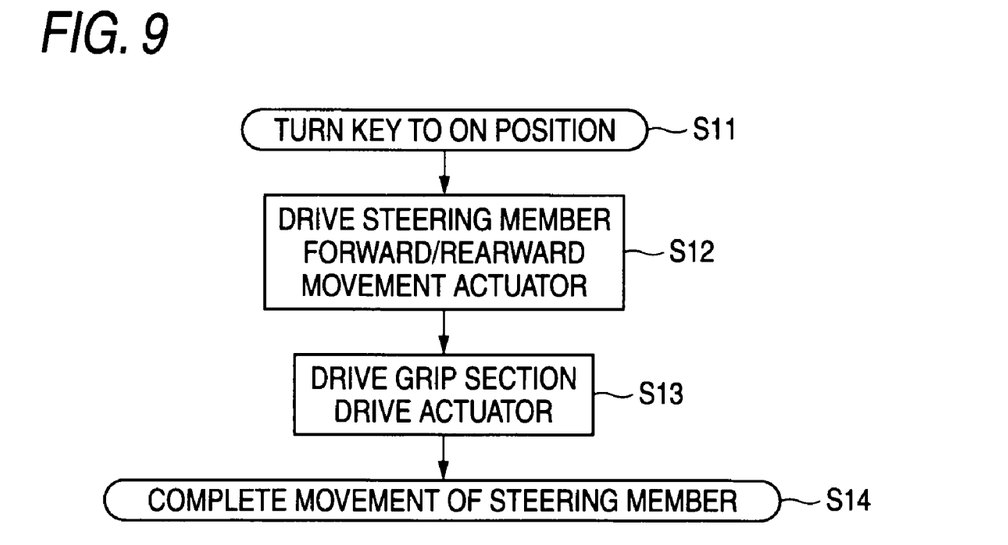
FIG. 9 is a flowchart showing example control performed until the steering member enters a state shown in FIG. 3.

FIG. 9 is a flowchart showing example control performed until the steering member 4 enters the state shown in FIG. 3.

By reference to FIGS. 2, 3, and 9, a key is inserted into a key insert position of an unillustrated vehicle while the steering member 4 is located at; for instance, the housing position and while the pair of grip sections 42, 42 are located at; for instance, the nonoperating position (the state shown in FIG. 2). When the key is turned to an ON position (step S11), the controller 13 controls the steering member forward/rearward movement actuator 28, thereby driving the steering member forward/rearward movement actuator 28 (step S12). Hereby, the steering member 4 is driven by way of the support mechanism 16, whereupon the steering member 4 is placed at the projection position.

Next, the controller 13 controls the grip section drive actuator 44 (see FIG. 6), thereby driving the grip section drive actuator 44 (step S13). Hereby, the pair of rotary arms 41, 41 and the pair of grip sections 42, 42 are rotated, and the pair of grip sections 42, 42 are put in the operating position. Hereby, movement of the steering member 4 is completed (step S14), and the steering member 4 enters the state shown in FIG. 3.

Displacement of the pair of grip sections 42, 42 from the nonoperating position to the operating position may also be performed after the steering 4 is put in the projection position or in the course of the steering member 4 being displaced from the housing position to the projection position.

Figure 10:
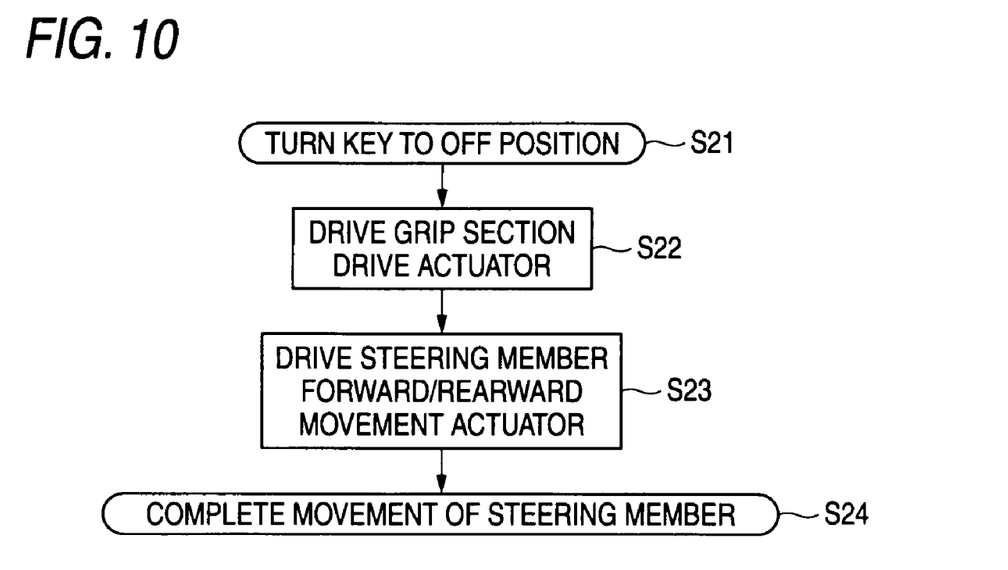
FIG. 10 is a flowchart showing example control performed until the steering member enters a state shown in FIG. 2.

FIG. 10 is a flowchart showing example control performed until the steering member 4 enters the state shown in FIG. 2.

By reference to FIGS. 2, 3, and 10, when the key is turned to an OFF position while the steering member 4 is located at; for instance, the projection position and while the pair of grip sections 42, 42 are located at; for instance, the operating position (the state shown in FIG. 3) (step S21), the controller 13 controls the grip section drive actuator 44 (see FIG. 6), thereby driving the grip section drive actuator 44 (step S22). The pair of rotary arms 41, 41 and the pair of grip sections 42, 42 are hereby rotated, and the pair of grip sections 42, 42 are put in the nonoperating position.

Next, the controller 13 controls the steering member forward/rearward movement actuator 28, thereby driving the steering member forward/rearward movement actuator 28 (step S23). The steering member 4 is hereby driven by way of the support mechanism 16, and the steering member 4 is put in the housing position. Movement of the steering member 4 is hereby completed (step S24), and the steering member 4 enters the state shown in FIG. 2.

Displacement of the pair of grip sections 42, 42 from the operating position to the nonoperating position may also be performed when the steering member 4 is located at the projection section or in the course of the steering member 4 being displaced from the projection position to the housing position. In the latter case, the pair of grip sections 42, 42 must be placed at the nonoperating position until the steering member 4 reaches the opening 27.

As mentioned above, in the present embodiment, displacement of the steering member 4 is automatically performed between the housing position and the projection position. The convenience of the vehicle steering apparatus 1 is hereby enhanced. In the present embodiment, displacement of the pair of grips sections 42, 42 is automatically performed between the nonoperating position and the operating position. Consequently, the driver does not need to manually pull up the pair of grip sections 42, 42 before starting steering operation, so that the convenience of the vehicle steering apparatus 1 is further enhanced.

In the present embodiment, the pair of rotary arms 41, 41 and the pair of grip sections 42, 42 are collapsible in relation to the steering member main body 40. Hence, the steering member 4 becomes compact. Consequently, the size of the opening 27 can be reduced, and the space for housing the steering member 4 can also be reduced. The vehicle steering apparatus 1 is hereby further miniaturized.

The present invention is not limited to the specifics of the embodiment mentioned above and is variously susceptible within the scope of claims. For instance, in the foregoing embodiment, when the steering member 4 is located in the projection position, the position of the steering member 4 may also be made adjustable in accordance with the drivers preference.

Specifically, when the steering member 4 is located at the projection position, the steering member 4 may also be displaced by the steering member forward/rearward movement actuator 28, to thus allow adjustment of position of the steering member 4. Alternatively, a tilt mechanism, a telescopic mechanism, or the like, may also be provided aside from the steering member forward/rearward movement actuator 28, to thus enable tilt adjustment, telescopic adjustment, or the like, of the steering member 4.

In the foregoing embodiment, shock absorption means may also be provided on the link between; for instance, the first link arm 17 and the base 21, thereby enabling absorption of physical shock which would arise at the time of so-called secondary collision.

The foregoing embodiment has been described for the case where the vehicle steering apparatus 1 is a vehicle steering apparatus of so-called steer-by-wire type. However, the vehicle steering apparatus 1 is not limited to a vehicle steering apparatus of steer-by-wire type but may also be another vehicle steering apparatus, such as an electric or hydraulic vehicle steering apparatus.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-233601 filed on Sep. 10, 2007, the contents of which are incorporated herein for reference.

What is claimed is:

1. A vehicle steering apparatus, comprising:
   a steering member for rotational operation;
   a support mechanism that supports the steering member so as to be movable between a housing position where the steering member is housed in a fixed frame of an instrument panel and a projection position where the steering member projects to an outside of the fixed frame, and that regulates an attitude of the steering member located between the housing position and the projection position; and
   a movable frame that moves together with the steering member, and that constitutes a part of the instrument panel by covering an opening formed in the fixed frame of the instrument panel when the steering member is housed at the housing position,
   wherein the movable frame is oriented at a same position with respect to the steering member in each of the housing position and the projection position.

2. The vehicle steering apparatus according to claim 1, wherein the support mechanism includes:
   a link mechanism having first and second link arms whose first ends are rotatably supported by a base respectively and a third link arm which has first and second ends rotatably linked to second ends of the first and second link arms respectively; and
   a support frame which is fixed to the third link arm through a bracket and which rotatably supports the steering member.

3. The vehicle steering apparatus according to claim 2, further comprising:
   a steering member forward/rearward movement actuator that drives the steering member between the housing position and the projection position through the support mechanism,
   wherein the steering member forward/rearward movement actuator includes a direct drive actuator which rotates any one of the first link arm and the second link arm.

4. The vehicle steering apparatus according to claim 1, further comprising:

a cover that covers at least a portion of the opening of the fixed frame when the steering member is located at the projection position.

5. The vehicle steering apparatus according to claim 1, further comprising:

a steering member forward/rearward movement actuator that drives the steering member between the housing position and the projection position through the support mechanism.

6. The vehicle steering apparatus according to claim 1, further comprising:

a turning mechanism that turns driving wheels, wherein the steering member is not mechanically linked to the turning mechanism.

7. The vehicle steering apparatus according to claim 1, further comprising:

a cover that covers at least a portion of the opening of the fixed frame when the steering member is located at the projection position, wherein the cover and the movable frame are formed in a substantially similar non-planar shape.

8. The vehicle steering apparatus according to claim 1, further comprising:

an actuator configured to move the steering member in a forward and a rearward direction.

9. The vehicle steering apparatus according to claim 8, further comprising:

a link mechanism;

a bracket; and a support frame which is fixed to the link mechanism through the bracket and which rotatably supports the steering member.

10. The vehicle steering apparatus according to claim 9, further comprising:

a cover that covers at least a portion of the opening of the fixed frame when the steering member is located at the projection position, wherein the cover is fixed to the bracket.

* * * * *